United States Patent
Chelian et al.

(10) Patent No.: US 10,052,764 B2
(45) Date of Patent: Aug. 21, 2018

(54) AUTOMATED AND ADJUSTABLE PLATFORM SURFACE

(71) Applicant: Toyota Motor Engineering & Manufacturing North America, Inc., Erlanger, KY (US)

(72) Inventors: Suhas E. Chelian, San Jose, CA (US); Keith J. Wells, Evansville, IN (US); Robert D. McClain, Haubstadt, IN (US)

(73) Assignee: TOYOTA MOTOR ENGINEERING & MANUFACUTRING NORTH AMERICA, INC., Plano, TX (US)

( * ) Notice: Subject to any disclaimer, the term of this patent is extended or adjusted under 35 U.S.C. 154(b) by 51 days.

(21) Appl. No.: 15/184,869

(22) Filed: Jun. 16, 2016

(65) Prior Publication Data
US 2017/0361462 A1    Dec. 21, 2017

(51) Int. Cl.
*B25J 9/16* (2006.01)
*B25J 5/00* (2006.01)
*B25J 13/00* (2006.01)

(52) U.S. Cl.
CPC ............. *B25J 9/1664* (2013.01); *B25J 5/005* (2013.01); *B25J 5/007* (2013.01); *B25J 9/1669* (2013.01);
(Continued)

(58) Field of Classification Search
CPC ........ B25J 5/007; B25J 11/008; B25J 9/1697; B25J 5/00; B25J 9/0096; B25J 9/1664;
(Continued)

(56) References Cited

U.S. PATENT DOCUMENTS

| 3,963,096 A | 6/1976 | Jones |
| 5,285,992 A | 2/1994 | Brown |

(Continued)

FOREIGN PATENT DOCUMENTS

| CN | 100436080 | 11/2008 |
| CN | 102380866 | 3/2012 |

(Continued)

OTHER PUBLICATIONS

Norris Labs, *RoboStool—Furniture. On-Demand*, 2012, 2 pages.
(Continued)

*Primary Examiner* — Jason Holloway
(74) *Attorney, Agent, or Firm* — Snell & Wilmer LLP

(57) ABSTRACT

Methods, systems, and apparatus for an automated platform system. The automated platform system includes a docking station and a personal device connected to an automated robot platform. The automated robot platform includes one or more arms and an adjustable platform surface. The automated robot platform includes one or more imaging devices configured to receive imaging feedback and one or more transportation components coupled to the base. The one or more transportation components are configured to move in multiple directions. The automated robot platform includes one or more data processors that are configured to obtain imaging feedback. The one or more data processors are configured to operate the one or more transportation components to move in multiple directions to a first location based on the imaging feedback, and adjust the adjustable platform surface to a first height and a first angle.

13 Claims, 12 Drawing Sheets

(52) U.S. Cl.
CPC .......... *B25J 9/1697* (2013.01); *B25J 13/006* (2013.01); *Y10S 901/01* (2013.01)

(58) Field of Classification Search
CPC ........ B25J 9/1669; B25J 13/006; B25J 5/005; A61G 7/1046; Y10S 901/01
See application file for complete search history.

(56) References Cited

U.S. PATENT DOCUMENTS

| | | |
|---|---|---|
| 5,461,736 A | 10/1995 | Carpenter et al. |
| 6,158,552 A | 12/2000 | Gould et al. |
| 7,011,171 B1 | 3/2006 | Poulter |
| 8,272,830 B2 | 9/2012 | Kurita et al. |
| 8,326,469 B2 | 12/2012 | Phillips et al. |
| 2005/0126144 A1* | 6/2005 | Koselka .................. A01D 46/30 56/10.2 R |
| 2006/0213167 A1* | 9/2006 | Koselka .................. A01D 46/30 56/10.2 A |
| 2007/0080000 A1* | 4/2007 | Tobey ..................... A61G 5/045 180/21 |
| 2007/0199108 A1* | 8/2007 | Angle ...................... B25J 5/007 318/568.12 |
| 2010/0036245 A1* | 2/2010 | Yu ........................... A61N 5/1027 600/439 |
| 2010/0179691 A1 | 7/2010 | Gal et al. |
| 2012/0078417 A1* | 3/2012 | Connell, II ............... B25J 5/00 700/248 |
| 2013/0226341 A1* | 8/2013 | Sturm ...................... B25J 5/007 700/245 |
| 2013/0345872 A1* | 12/2013 | Brooks ................... B25J 9/0087 700/259 |
| 2014/0277847 A1* | 9/2014 | Cann ......................... B25J 5/007 701/2 |
| 2014/0308107 A1 | 10/2014 | Nickles |
| 2014/0324218 A1* | 10/2014 | Suzuki ................... B25J 9/1612 700/258 |
| 2015/0332213 A1* | 11/2015 | Galluzzo ................. B25J 5/007 700/216 |
| 2016/0121486 A1* | 5/2016 | Lipinski ................ B05B 13/005 427/427.3 |
| 2017/0093330 A1* | 3/2017 | Castellucci ............. H02S 20/32 |
| 2017/0203446 A1* | 7/2017 | Dooley ................... B25J 19/023 |
| 2017/0349039 A1* | 12/2017 | Rayner .................... B60K 1/04 |
| 2018/0043543 A1* | 2/2018 | Buibas .................. B25J 9/1697 |

FOREIGN PATENT DOCUMENTS

| | | |
|---|---|---|
| CN | 203592482 | 5/2014 |
| CN | 204322066 | 5/2015 |

OTHER PUBLICATIONS

Jackrit Suthakorn et al., *A Robotic Library System for an Off-Site Shelving Facility*, IEEE International Conference on Robotics & Automation, May 2002, 6 pages.

* cited by examiner

AUTOMATED AND ADJUSTABLE PLATFORM SURFACE

BACKGROUND

1. Field

This specification relates to an automated and adjustable platform surface.

2. Description of the Related Art

Individuals perform various day-to-day tasks that require a stepping stool or other adjustable surface for assistance. For example, an individual may need to reach a top shelf of a bookshelf that is out of their reach. In another example, an individual may want a surface to eat on while sitting and watching television. Other examples may include a doctor wanting a surface to lay surgical or medical tools on while visiting patients in different rooms.

Moving a chair, table, or other surface to assist them in performing the tasks may be inconvenient or difficult. For example, an individual may have their hands full and need to reach the top shelf. An individual eating a meal may want a surface to eat on but does not want to leave the couch for a table. The doctor, for example, may be carrying patient charts and not have the ability to push a cart carrying supplies. The patient may be incapacitated and unable to get up to get a meal.

Accordingly, there is a need for a system and method for an automatic stepping tool or an adjustable platform surface that automatically navigates to a user and adjusts the height and angle of the surface to assist the user.

SUMMARY

In general, one aspect of the subject matter described in this specification is an automated platform system. The automated platform system includes a docking station for charging an automated robot platform and a personal device connected to the automated robot platform through a network. The automated robot platform includes one or more arms coupled to and extending from a base and an adjustable platform surface coupled to the one or more arms. The automated robot platform includes one or more imaging devices configured to receive imaging feedback and one or more transportation components coupled to the base. The one or more transportation components are configured to move in multiple directions. The automated robot platform includes one or more data processors that perform operations stored on a computer readable storage medium. The one or more data processors are configured to obtain imaging feedback from the one or more imaging devices. The one or more data processors are configured to operate the one or more transportation components to move in multiple directions to a first location based on the imaging feedback, and adjust the adjustable platform surface to a first height and a first angle.

These and other embodiments may optionally include one or more of the following features. Each arm of the one or more arms of the automated platform system may include an actuator coupled to the base. Each arm may include a casing that has a cavity and a screw disposed within the cavity of the casing. The screw may be configured to rotate in either a clockwise or counter-clockwise rotation and at least a portion of the screw may be surrounded by the casing. The one or more arms may include a first arm and a second arm. The adjustable platform surface may include a first portion and a second portion. A first screw may be disposed within the cavity of the first arm and may be configured to move the first portion in a first direction along the first arm. A second screw may be disposed within a cavity of the second arm and may be configured to move the second portion in a second direction along the second arm. The one or more transportation components may include one or more wheels or one or more treads.

The automated platform system may include one or more beacons that send out a signal to guide the adjustable robot platform. The adjustable robot platform may include a transceiver that may be configured to receive the signal from the one or more beacons and may provide location information to the one or more processors. The transceiver may be configured to determine the location information from the one or more beacons based on the strength of the one or more beacons. The one or more processors may be configured to operate the one or more transportation components to move in the multiple directions based on the location information.

The personal device may be configured to send commands to the automated robot platform and may display navigational information and monitoring information of the automated robot platform. The automated robot platform may include a navigation unit and one or more sensors that are coupled to the one or more data processors. The one or more data processors may be configured to receive navigation information from the navigation unit and operate the one or more transportation components to move in the plurality of directions to a second direction to the location. The one or more data processors may be configured to receive sensor information from the one or more sensors and direct the one or more transportation components to move in a third direction to a second location. The one or more processors may determine that the automated robot platform is at the second location and adjust the adjustable platform surface to a second height and a second angle. The one or more data processors may be configured to detect a position or action of an individual using at least one or more microphones or the one or more imaging devices. The one or more data processors may be configured to determine that there is an activation event based on the position or action of the individual, and operate the one or more transportation components to move in a direction toward the location of the individual.

The automated platform system may include a docking station, and when the automated robot platform is in the docking station, the automated robot platform may be configured to collapse vertically into a compact form.

In another aspect, the subject matter is embodied in a method for controlling an automated robot platform. The method includes obtaining an activation request. The activation request includes one or more attributes for an adjustable platform surface, an execution time and an execution location. The method includes obtaining a current time and a current location. The method includes determining that the execution time and the current time match and moving in a direction toward the execution location from the current location. The method includes adjusting an adjustable platform surface based on the one or more attributes.

In another aspect, the subject matter is embodied in an automated robot platform. The automated robot platform includes at least one of a navigation unit, one or more sensors or a transceiver for navigation. The automated robot platform includes an adjustable platform assembly coupled to a transportation component. The transportation component is configured to move the automated robot platform. The adjustable platform assembly includes a base coupled to multiple arms and multiple adjustable platform surfaces.

The adjustable platform surfaces may be configured to move vertically and at an angle to the base.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, robots and methods for controlling an automated robot platform. Particular embodiments of the subject matter described in this specification may be implemented to realize one or more of the following advantages. An automated robot platform may automatically determine that an individual needs assistance and may travel to the individual. By automatically determining whether an individual needs assistance, the automated robot platform anticipates the needs of the individual. The automated robot platform may provide an adjustable platform surface that when deployed may assist the individual as a stepping stool or as a table surface. Additionally, the automated platform robot may transport one or more objects, e.g., a book or a meal, to the individual. This minimizes the load an individual, with or without a disability, has to carry.

The automated robot platform may collapse for storage to minimize the amount of storage space needed. The automated robot platform may automatically adjust the height of the adjustable platform surface based on the needs of the individual. For example, the automated robot platform may identify that the individual is reaching down to grab a book from the adjustable surface to place on a shelf, and in response, the automated robot platform may raise the adjustable platform surface so that the individual may grab the book more easily. This improves the safety and efficiency of performing a task.

Figure 1:
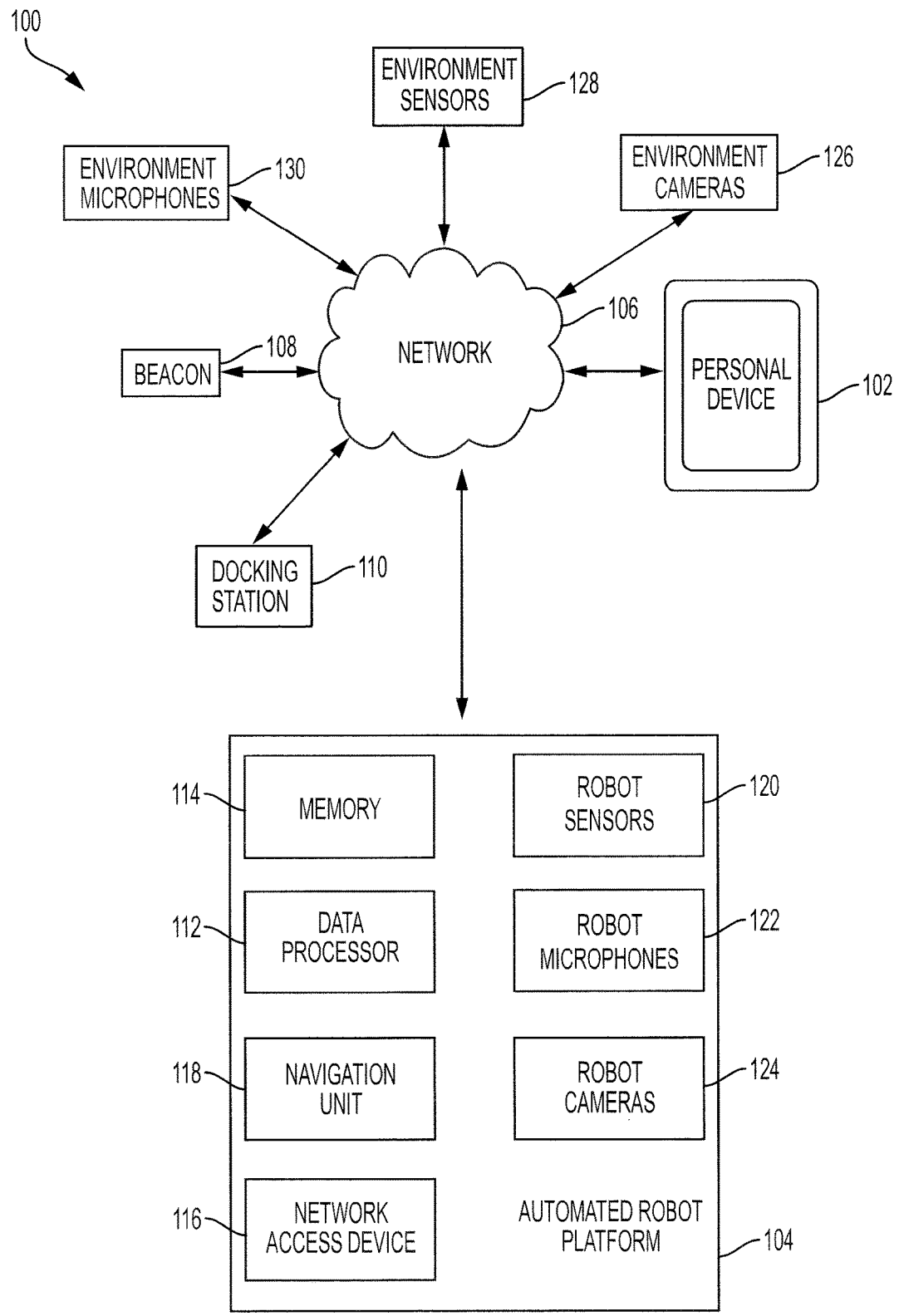
FIG. 1 is a block diagram of an example automated platform system according to an aspect of the invention.

FIG. 1 is a block diagram of an example automated platform system 100. The automated platform system 100 may include one or more automated robot platforms, e.g., a robot 104 having one or more data processors 112, appropriately programmed, to execute instructions on a computer storage medium, e.g., a memory 114, to assist a user.

The automated platform system 100 includes one or more computers, e.g., a personal device 102, coupled to one or more automated robot platforms, e.g., the robot 104, through a network 106. The automated platform system 100 may include one or more beacons 108 connected to the network 106. The network 106, such as a local area network (LAN), a wide area network (WAN), a cellular network, the Internet, a dedicated short-range communications (DSRC) or combinations thereof, connects the one or more computers to the one or more automated platform robots, e.g., the robot 104. The network 106 may be a wireless network or a wired network.

The automated platform system 100 may include one or more environment microphones 130, one or more environment sensors 128, and/or one or more environment cameras 126 coupled to the network 106. These devices may be configured to detect a user, navigate the robot 104 and/or detect one or more objects.

The personal device 102, e.g., a smart phone, a cellphone, a personal computer, a tablet, or other communication device of a user, may connect to the robot 104 through the network 106. The personal device 102 may connect to the robot 104 through an application, such as a mobile device application, or through a resource, such as a webpage. The personal device 102 may control and manage the robot 104 through the application or the resource and may function as an input/output device of the robot 104. For example, the personal device 102 may command the robot 104 to travel to a particular location, such as the location of the user, to assist the user. Other commands may include, adjusting the vertical height or angle of the adjustable platform surface.

The personal device 102 may receive health information, such as maintenance faults, historical information, such as past commands and/or routes travelled, and monitoring information, such as battery power level and/or location of the robot 104, to display to the user. The personal device 102 may provide operational data to the robot 104 through the network 106 to configure the robot 104. In some implementations, the operational data is programmed at the factory.

Operational data is data that assists the robot 104 to perform the functions of holding, carrying, transporting one or more objects, and/or otherwise assisting a user. The operational data may include pre-programmed data to perform functions, such as navigation or setting configurations. The operational data may include navigational information, a schedule, and/or configuration settings. In some implementations, the operational data may be transmitted wirelessly directly from the personal device 102 to the robot 104.

Navigational information describes a route for the robot 104 to travel to assist a user. A route is a path from a starting location to a destination location. For example, the route may direct the robot 104 from the robot's docking station 110 in the kitchen to the user's location in the study room. The starting location may be a current location of the robot. The destination location may be a current location of the user or a predicted location of the user.

A location may include map coordinates, e.g., latitude and longitude coordinates, or may be a relational location relative to one or more objects or one or more beacons 108. That is, the location may be determined using the distance from one or more imaging devices, e.g., LIDAR, time-of-flight (TOF) range-imaging camera, structured light rangers, robot cameras 124 or environment cameras 126, or one or more sensors, e.g., robot sensors 120 or environment sensors 128, to one or more beacons 108 or one or more objects. An example relational location may be a location 1 foot left of an object or 2 feet right of the object. In some implementations, the relational location is determined using one or more robot cameras 124 or one or more environment cameras 126. In some implementations, the relational location is determined using one or more robot sensors 120 or one or more environment sensors 128.

Operational information may include a schedule. The schedule may be programmed by a user on the personal device 102. The schedule may store one or more events. For example, a "lunch" event, a "story-time" event, a "television" event or a "hospital rounds" event. An event is any scheduled meeting, appointment or activity. The event may be included in a calendar that may be obtained by the robot 104 from the personal device 102, e.g., across the network 106. The one or more events may each be associated with an activation request. An activation request is a request for the robot 104 to assist the user. The activation request may include an execution time, an execution date, an execution location, and/or one or more attributes. The execution time is the time the robot 104 is to perform the assistance. The execution date is the date the robot 104 is to perform the assistance, e.g. Mar. 2, 2016, every weekday, or Saturday. The execution location is the location where the robot 104 travels to assist the user, e.g., at a location next to a lounge chair or a bookshelf. The one or more attributes may include the height the robot extends one or more adjustable platform surfaces vertically and/or the angle or tilt of the one or more adjustable platform surfaces.

Configuration settings may include one or more notification settings for when to send or transmit one or more notifications to a user on the personal device 102. Notifications may include an indication that the power level is low, a confirmation request to perform an activation request, an alert of a malfunction and/or that a load exceeds a safety margin. Other configuration settings may include one or more pre-programmed heights and/or angles for the adjustable platform surface for one or move modes.

The automated platform system 100 may include a docking station 110 that is connected to a power source, e.g., an electrical outlet for providing power to the robot 104. The docking station 110 may charge a battery of the robot 104. The docking station 110 may be coupled to a power source, such as a solar panel or other power source. The docking station 110 may have a connector that interfaces with another connector on the robot 104 to charge and/or provide instructions to the robot 104. In some implementations, the docking station 110 may charge and/or provide instructions to the robot 104 wirelessly. The connector may be a female connector or a male connector that connects to a corresponding male connector or female connector, respectively, of the robot 104. The connector may include one or more electrical contacts that are made of an electrically conductive material, e.g., copper wire, and may electrically connect the docking station 110 to the robot 104 to charge the robot 104. The personal device 102 may provide operational data to the docking station 110 through the network 106 to configure the robot 104. In some implementations, the personal device 102 may transmit the operational data directly to the robot 104.

The robot 104 may include a memory 114, one or more data processors 112, a network access device 116, a navigation unit 118, one or more robot cameras 124, one or more robot microphones 122 and/or one or more robot sensors 120. Other components of the robot 104 may be described in further detail in reference to FIGS. 2-5.

The memory 114 may store instructions to execute on the one or more data processors 112 and may include one or more of a RAM or other volatile or non-volatile memory. The memory 114 may be a non-transitory memory or a data storage device, such as a hard disk drive, a solid-state disk drive, a hybrid disk drive, or other appropriate data storage, and may further store machine-readable instructions, which may be loaded and executed by the one or more data processors 112 that may be coupled to the memory 114.

The robot 104 may include one or more data processors 112 coupled to at least one of the navigation unit 118, the network access device 116, the one or more robot cameras 124 and the one or more robot sensors 120. The navigation unit 118 may include a Global Positioning System (GPS) device. The navigation unit 118 may perform navigation functions. Navigation functions may include, for example, providing navigation instructions, providing a route, providing a current location of the robot 104, and providing date/time information.

The robot 104 may include a network access device 116 that may be coupled to the one or more data processors 112. The network access device 116 may be configured to allow the robot 104 to connect to the personal device 102 to receive management and control information, such as one or more commands to come to a particular location and/or adjust the height and/or angle of the platform surface.

The robot 104 may include one or more robot sensors 120 that may be coupled to the one or more data processors 112. The one or more robot sensors 120 may include a weight sensor on the adjustable platform surface, a battery sensor, one or more pressure sensors on the adjustable platform surface, a transceiver and/or a proximity sensor. The battery sensor may detect the amount power remaining to operate the robot 104. The weight sensor may detect the weight of the load on the adjustable platform surface, and if the load exceeds a threshold, a notification may be sent or transmitted to the personal device 102. The pressure sensor may detect the balance of one or more objects on the adjustable platform surface, and if the adjustable platform surface is imbalanced, a notification may be sent or transmitted to the user on the personal device 102. The proximity sensor, e.g., a camera, LIDAR, or ultrasonic device, may detect one or more objects in the route of the robot 104. The one or more robot cameras 124 may be used to navigate and guide the robot 104 among one or more locations. In some implementations, the transceiver detects a beacon and guides the robot 104 toward the beacon 108 to travel to an execution location. In some implementations, the robot 104 uses the one or more robot microphones 122, e.g., one or more stereo microphones or one or more omni-directional microphones, to guide the robot 104 toward the execution location.

The robot 104 may include a navigation unit 118 that may obtain a current location of the robot 104. The robot 104 may use the navigation unit 118 to guide the robot 104 among one or more locations. The one or more locations may be inputted by a user on the personal device 102 and obtained and/or stored by the robot 104. The one or more locations may be used to generate a map of the environment that assists the robot 104. The robot 104 may use the current location, the one or more locations, and/or the map to generate a route among the one or more locations. For example, a user may input a location of a bookshelf, a chair, and/or a bed along with a location of other objects, such as a desk or a television. The user may request that the robot 104 travel to the bookshelf so that the user may use the robot 104 as a stepping stool. The robot 104 may generate a route to the bookshelf that avoids running into the chair and the desk using the map. In some implementations, the one or more sensors interact with one or more cameras and/or one or more microphones 122, e.g., the sensors, the cameras and/or the microphones of the robot 104 or the operating environment 200, to guide the robot 104 via video feedback and/or audio feedback. For example, in the above example, the robot 104 may detect that a dog is in the path of the route being travelled by the robot 104 so the robot 104 may adjust the route travelled to avoid hitting the dog.

Figure 2:
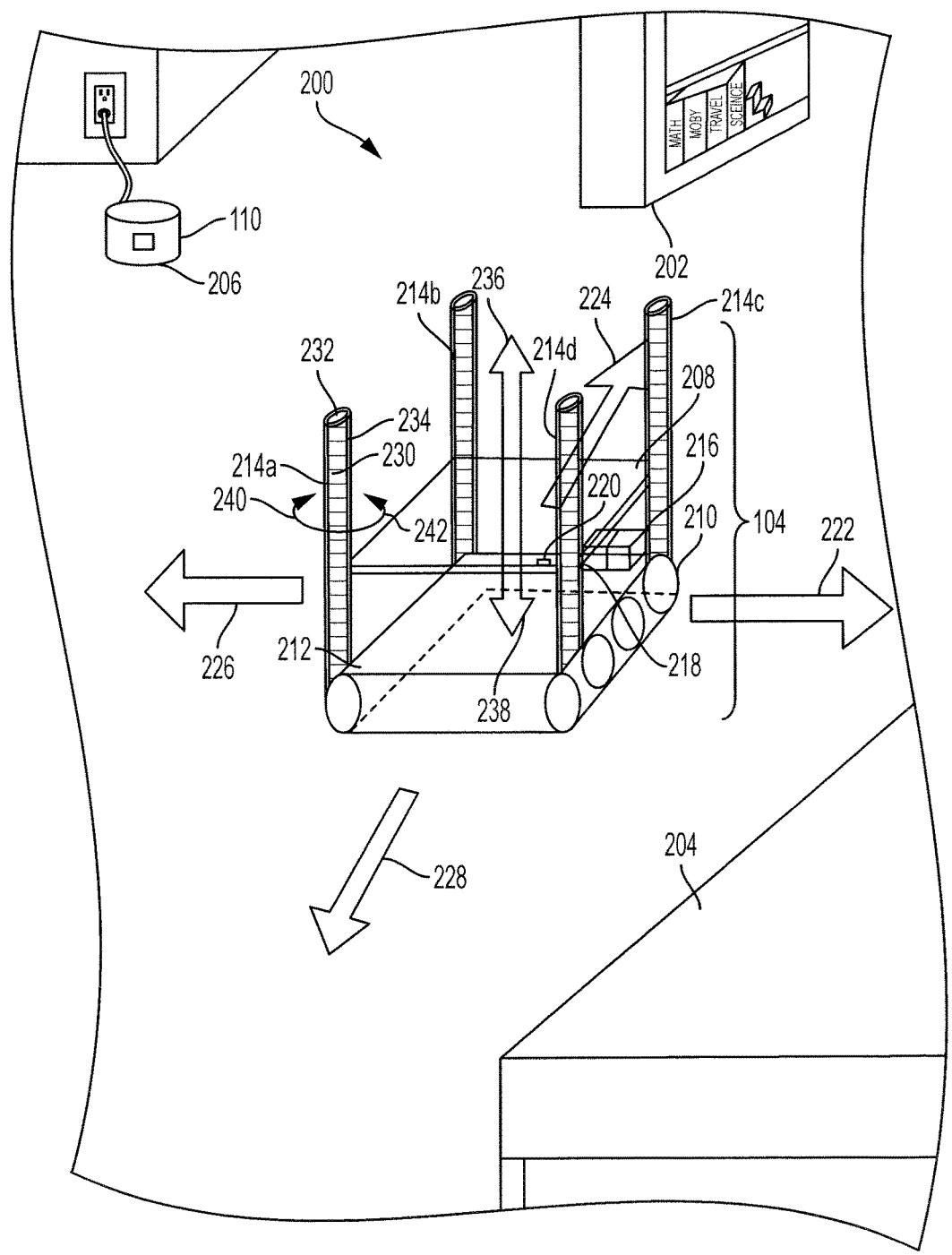
FIG. 2 is an illustration of an example operational environment for an automated platform robot according to an aspect of the invention.

FIG. 2 is an illustration of an example operating environment 200 of the automatic platform robot. One or more computers or one or more data processing apparatuses, for example, the one or more data processors 112 of the automated platform system 100 of FIG. 1, appropriately programmed, may operate the robot 104 to provide assistance to the user.

The operating environment 200 includes the robot 104, the docking station 110, and one or more locations, such as a first location 202, a second location 204 and a home location 206. The first location 202, for example, may be a location of a bookshelf and the second location 204, for example, may be a location of a bed.

The home location 206 is the location where the robot 104 may connect to the docking station 110 to charge. The robot 104 may be configured to return to the home location when the power level of the robot is low. The other locations, e.g., the first location 202 and the second location 204, are locations where a user may need assistance of the robot 104 to carry an object and/or otherwise assist the user, for example, as a stepping stool. The robot 104 may be directed to any of the one or more locations based on a schedule or user input.

The robot 104 includes one or more adjustable platform surfaces, e.g., an adjustable platform surface 208, and one or more transportation components 210, e.g., a belt, a hydraulic, one or more wheels and/or one or more treads. The robot 104 may include a base 212, one or more arms, e.g. arms 214a-d, a battery 216, a motor 218 and a docking connector 220. The adjustable platform surface 208 may be made of a rigid material, such as wood, plastic or metal. The adjustable platform surface 208 may be horizontal, i.e., parallel to the ground and/or a base 212 and at a 0 degree angle relative to the ground and/or base. The adjustable platform surface 208 may be configured to be angled relative to the ground and/or base, such that the angle is greater than or equal to 0 degrees, but less than 90 degrees. The robot 104 may include one or more actuators coupled to the adjustable platform surface 208 to change the height and/or the angle of the adjustable platform surface 208. The adjustable platform surface 208 may be rectangular, circular, square, or any other shape.

The robot 104 may include a base 212. The base 212 may include a docking connector 220. The docking connector 220 may electrically connect to the docking station 110 to receive power to charge the battery 216 when coupled to the docking station 110. One or more batteries 216 may be coupled to the base 212. The one or more batteries 216 may provide power to operate the motor 218 to move the robot 104 using the one or more transportation components 210. The motor 218 may power one or more actuators connected to the one or more arms 214 and may be configured to rotate one or more screw-like structures to raise, lower and/or angle the adjustable platform surface 208.

The base 212 may be coupled to one or more arms 214a-d, the battery 216, the motor 218 and/or the one or more transportation components 210. Power from the battery 216 may be used to provide power to the motor 218 to operate the one or more screw-like structures in the one or more arms and/or the one or more transportation components 210.

The one or more arms, e.g., arms 214a-d may each include a tube, e.g., tube 234, that forms a cavity, e.g., cavity 232, within the tube. The one or more arms, e.g., arms 214a-d, may be positioned at one or more corners or one or more edges of the adjustable platform surface 208. A screw-like structure 230, e.g., may be disposed of within each tube 234. The screw-like structure 230 may have grooves that interface with the adjustable platform surface 208. The motor 218 may be configured to rotate each screw-like structure in a clockwise rotation 240 or counter-clockwise rotation 242 such that the adjustable platform surface 208 connected to the one or more arms moves in a vertical direction, e.g., in directions 236 and 238. For example, motor 218 may rotate the screw-like structure 230 in a clockwise rotation 240 to adjust a portion of the adjustable platform surface 208 in a direction 236 and rotate the screw-like structure 230 in a counter-clockwise rotation 242 to adjust the portion of the adjustable platform surface 208 in an opposite direction 238. In some implementations, a clockwise rotation 240 adjusts the portion of the adjustable platform surface in direction 238 and a counter-clockwise rotation 242 adjusts the portion of the adjustable platform surface in an opposite direction 236.

The motor 218 may rotate each of the screw-like structures in each of the one or more arms in unison so that the adjustable platform surface 208 is raised or lowered to a particular height and remains parallel to the base 212. In some implementations, the motor 218 may rotate one screw-like structure at a different rate than a second screw-like structure. For example, if the motor 218 rotates one or more front screws of one or more arms holding a front portion of the adjustable platform surface 208 at a different rate than one or more back screws of the one or more other arms holding a back portion of the adjustable platform surface 208, the front portion may be at a different height than the back portion and may angle the adjustable platform surface 208 relative to the base 212. The rate or the speed of rotation of each of the screw-like structures may correspond to the change in height for the particular portion of the adjustable platform surface connected. The one or more processors may be configured to coordinate the rate and/or the speed of rotation of each of the screw-like structures based on a desired height. The desired height may be pre-programmed, user-configured, and/or user-inputted and may be based on the activation request.

The robot 104 may include one or more transportation components 210 to move in multiple directions, e.g., in a first direction 222, a second direction 224, a third direction 226 and/or a fourth direction 228. The transportation components 210 may include one or more treads or one or more wheels coupled to the base 212 to move in multiple directions. The base 212 may rotate the one or more transportation components 210 to direct the robot 104. In some implementations, the individual transportation component, such as a wheel, is rotated to direct the robot 104 in the different directions. One or more actuators may be used to rotate the one or more wheels or the base 212. The one or more transportation components 210 may be configured to lock and prevent movement of the one or more wheels or the one or more treads.

Figure 3A:
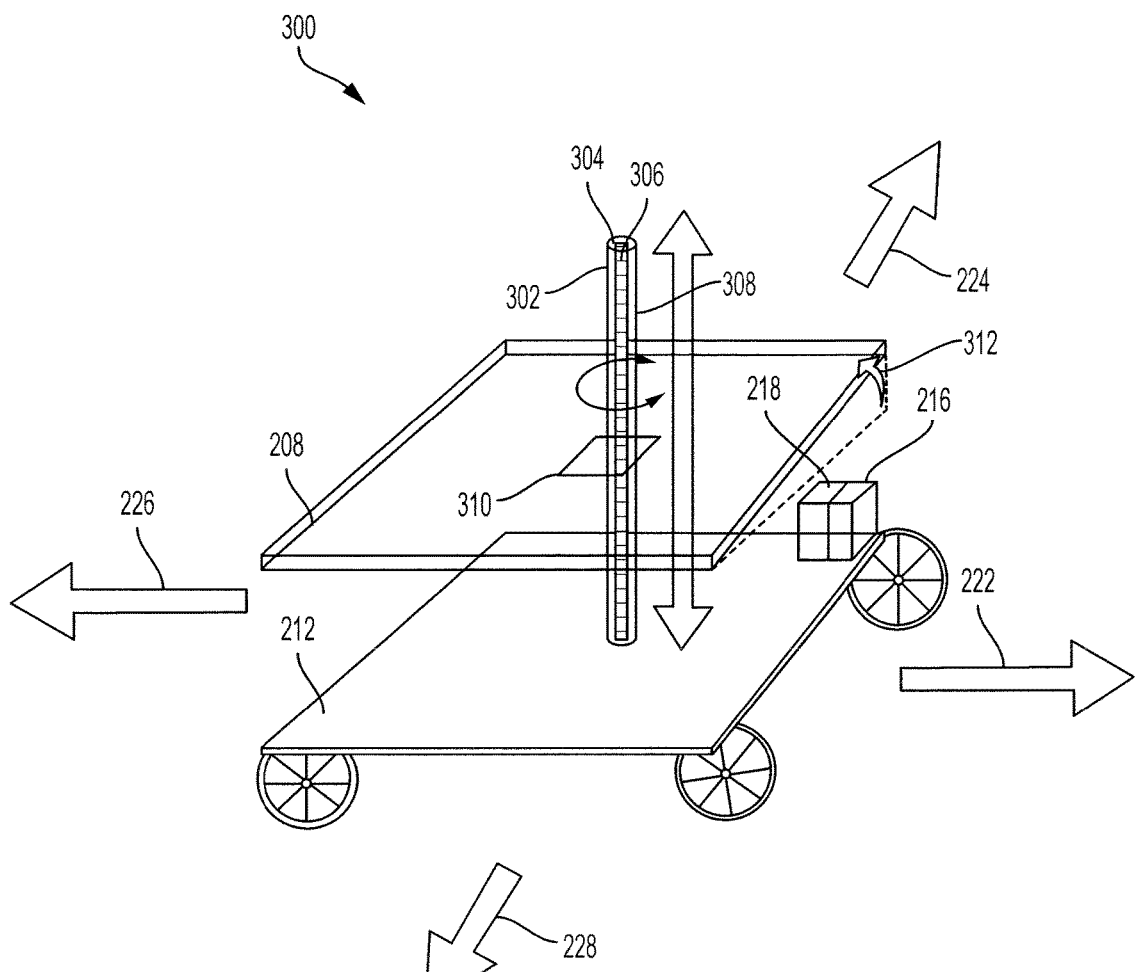
FIG. 3A is an illustration of an example automated robot platform in a single arm configuration according to an aspect of the invention.
Figure 3B:
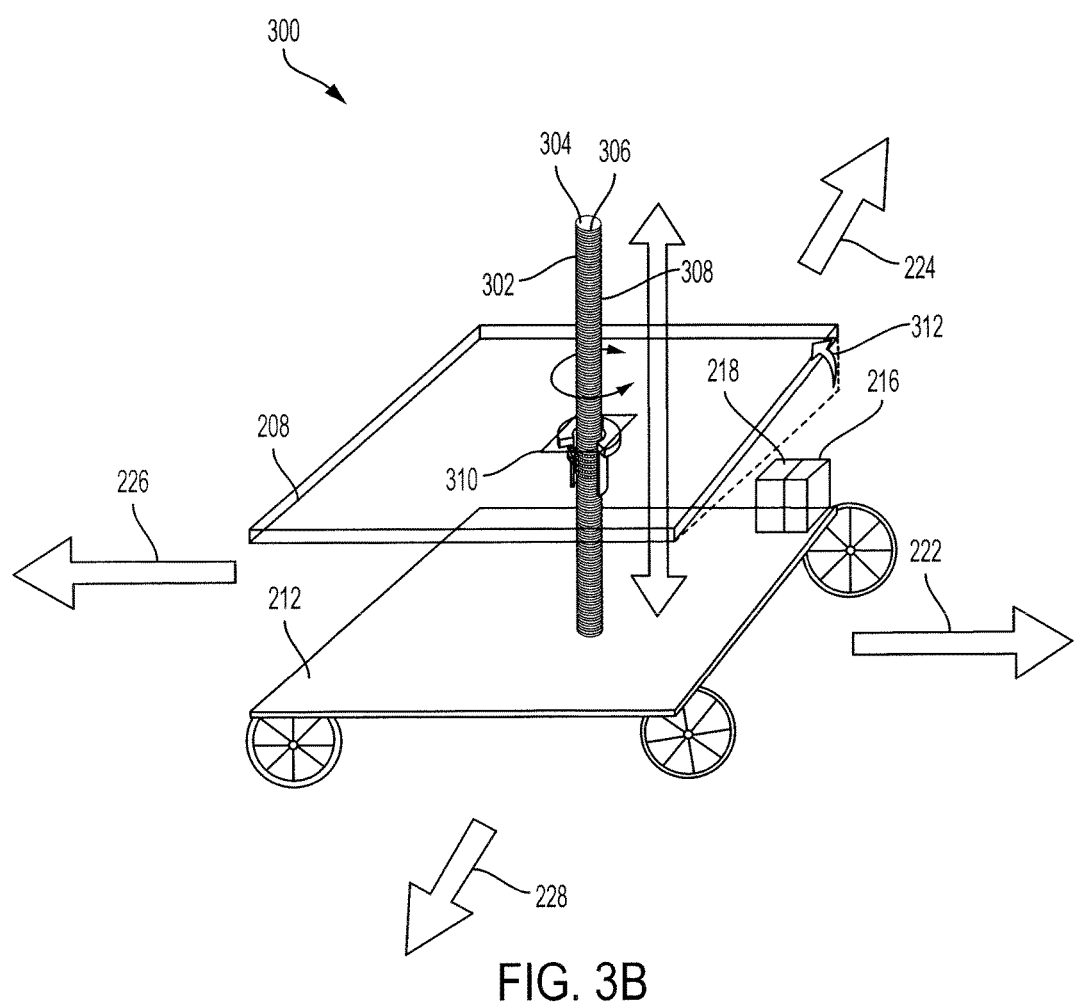
FIG. 3B is an illustration of an example automated robot platform in a configuration using a ball screw to adjust the adjustable platform surface according to an aspect of the invention.
Figure 3C:
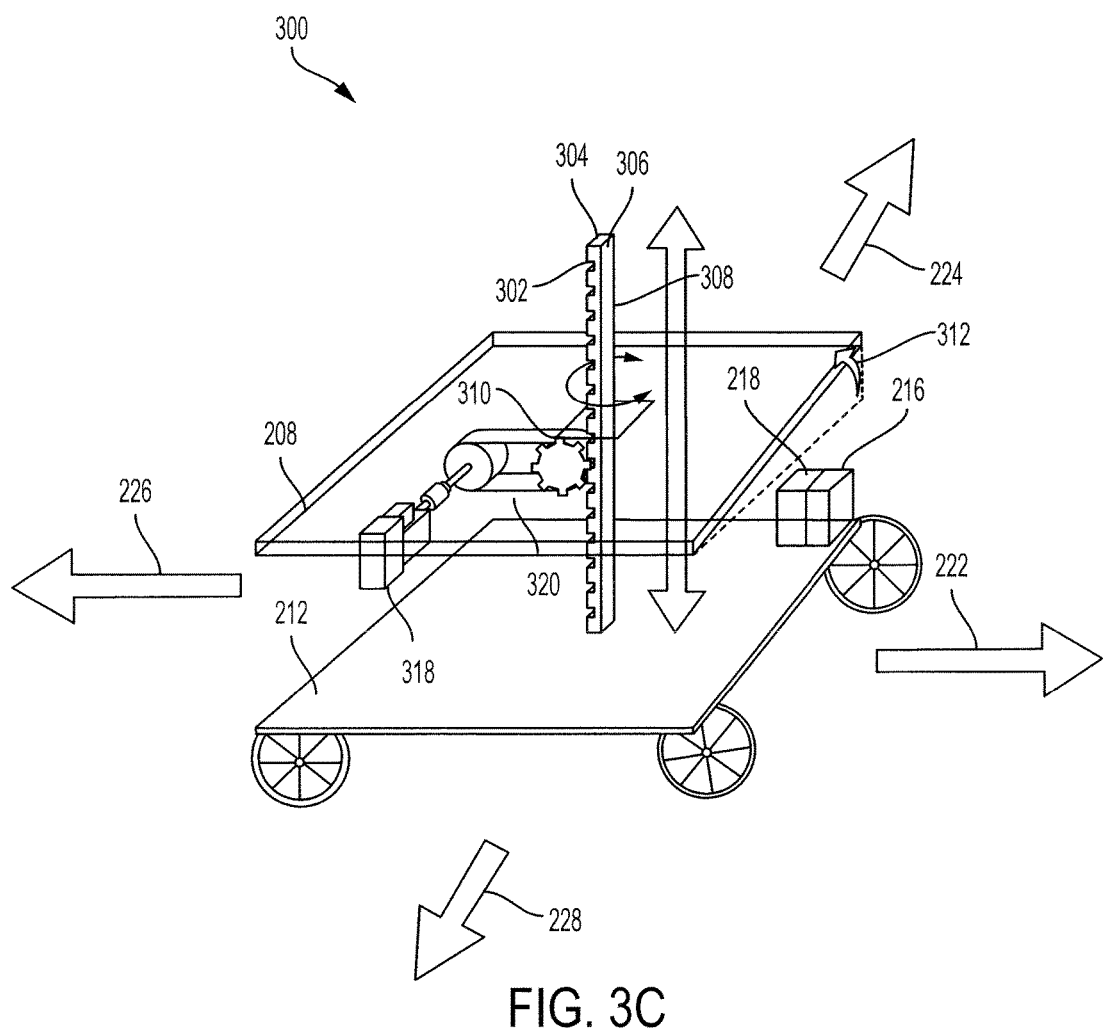
FIG. 3C is an illustration of an example automated robot platform in a configuration using a servo with a belt to adjust the adjustable platform surface according to an aspect of the invention.
Figure 3D:
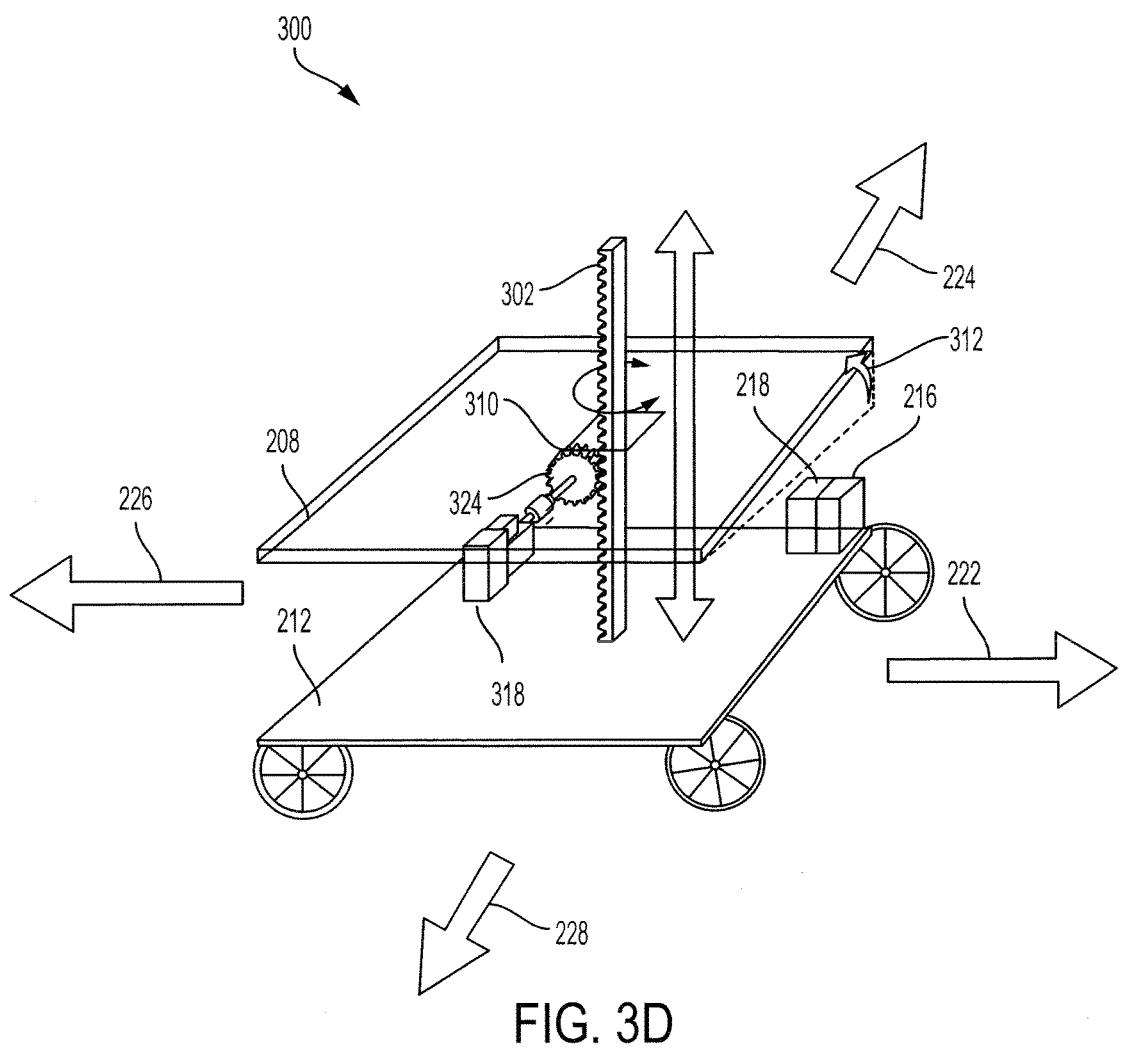
FIG. 3D is an illustration of an example automated robot platform in a configuration using a servo with a spur gear to adjust the adjustable platform surface according to an aspect of the invention.

FIG. 3A is an illustration of an example automated robot platform in a single arm configuration 300. One or more computers or one or more data processing apparatuses, for example, the one or more data processors 112 of the automated platform system 100 of FIG. 1, appropriately programmed, may operate the robot 104.

The robot 104 may use a single arm, e.g., arm 302. The arm 302 may be positioned in the center or near the center of the adjustable platform surface 208. The center of the adjustable platform surface 208 may be a location on the adjustable platform surface 208 that is equidistant to all edges and/or corners of the adjustable platform surface 208. The arm 302 may be positioned such that when no object is on the adjustable platform surface 208, the adjustable platform surface 208 is balanced and level.

The adjustable platform surface 208 may be rigidly connected to the arm 302, such that the adjustable platform surface 208 does not tip or angle due to the load of an object being placed on the adjustable platform surface 208.

The arm 302 may include a tube 308 that forms a cavity 304 and/or a screw-like structure 306. The screw-like structure 306 may be disposed of within the cavity 304. The screw-like structure 306 may rotate both clockwise and counter-clockwise to move the adjustable platform surface 208 vertically, as described above. An angling device 310 may be attached to the adjustable platform surface 208 and may be configured to tilt or angle the adjustable platform surface 208 at an angle 312 between 0 degrees where the adjustable platform surface 208 is parallel to the base 212 and nearly 90 degrees where the adjustable platform surface 208 is nearly vertical and/or perpendicular to the base 212.

Figure 3E:
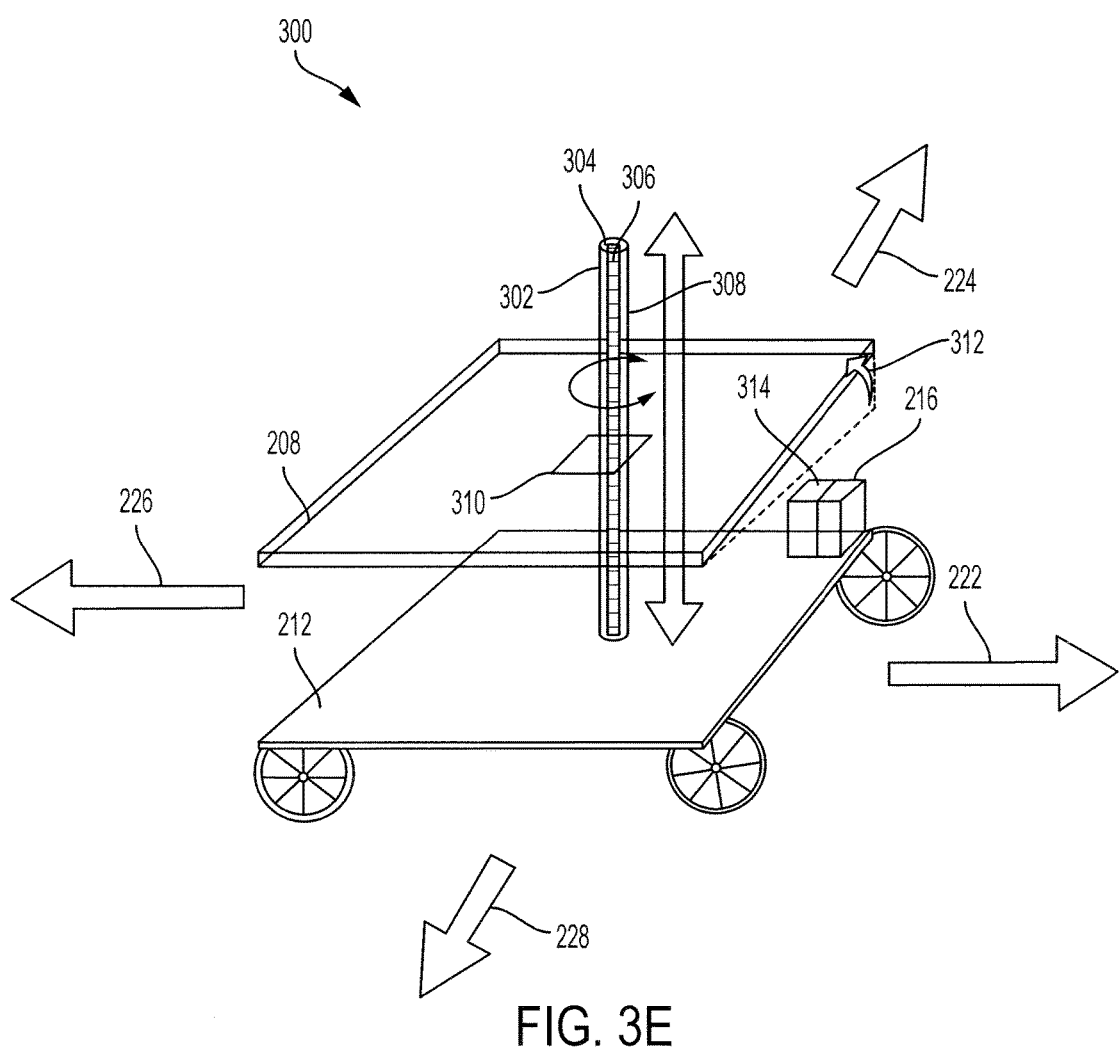
FIG. 3E is an illustration of an example automated robot platform in a configuration using a stepper motor according to an aspect of the invention.
Figure 3F:
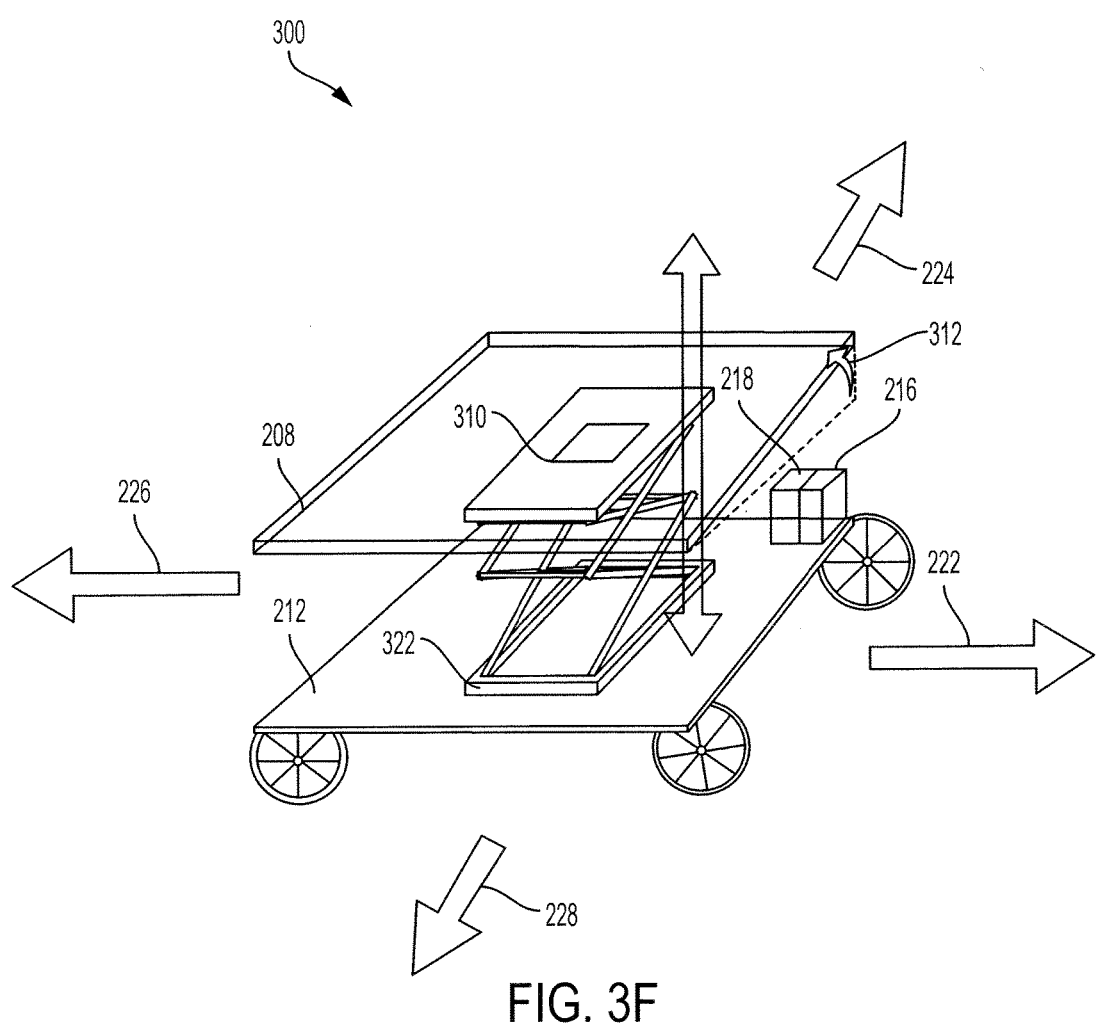
FIG. 3F is an illustration of an example automated robot platform in a configuration using a scissor lift according to an aspect of the invention.

In some implementations, the robot 104 may use other lifting and/or adjusting mechanisms to adjust the adjustable platform surface 208, such as a ball screw 316, a servo 318 with a belt 320, a servo 318 with a spur gear 324 or a scissor lift 322, as shown in FIGS. 3B-D and FIG. 3F, respectively. The servo 318 may be positioned on the base 212 or underneath the adjustable platform surface 208. In some implementations, a stepper motor 314, as shown in FIG. 3E, powers the robot 104 and/or the lifting and/or adjusting mechanism. In some implementations, the robot 104 may not move vertically, and the adjustable platform surface 208 acts as a stepping tool or table with automation.

Figure 4:
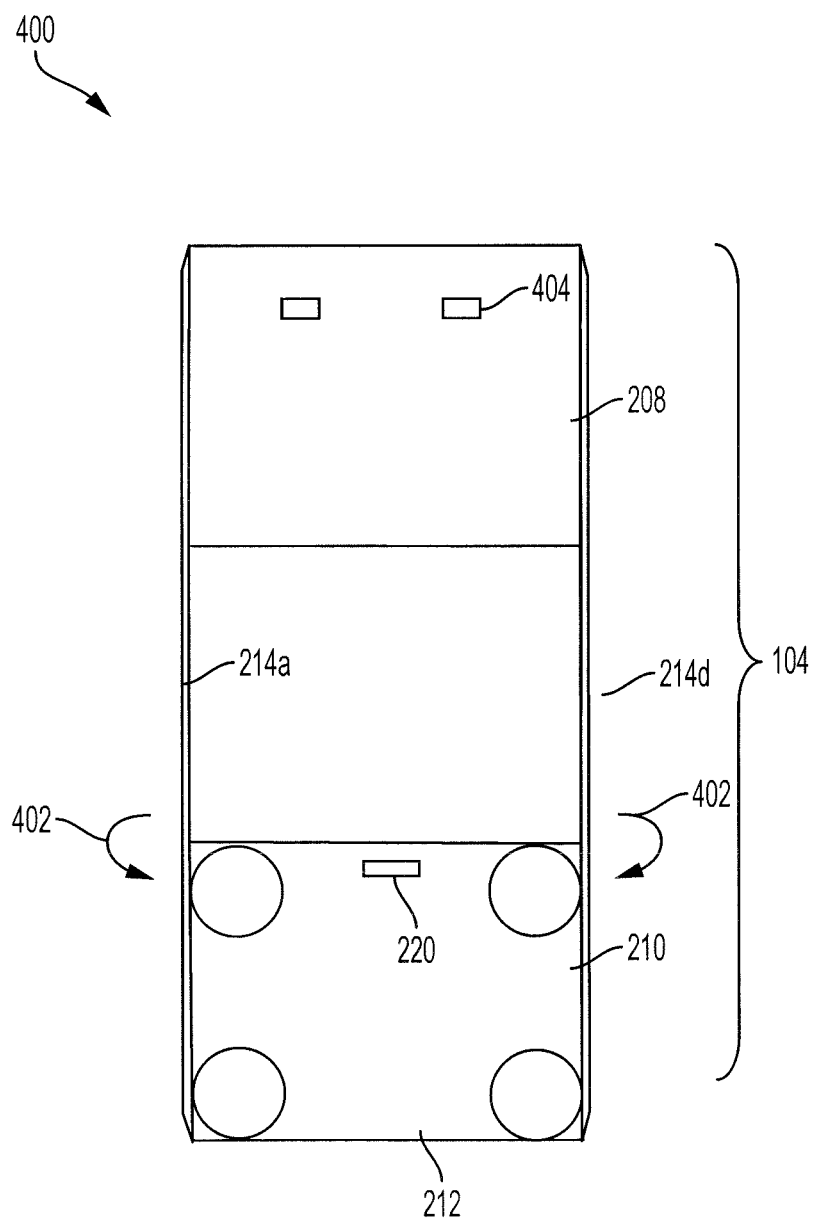
FIG. 4 is an illustration of an example automated robot platform in a collapsed configuration for storage according to an aspect of the invention.

FIG. 4 is an illustration of an example of the automated robot platform in a collapsed configuration 400 for storage. One or more computers or one or more data processing apparatuses, for example, the one or more data processors 112 of the automated platform system 100 of FIG. 1, appropriately programmed, may configure the robot 104 to collapse for storage.

A user may send or transmit a request from the personal device 102 to the robot 104 to return to the docking station 110 and collapse for storage. The robot 104 may be configured to collapse to reduce the storage size of the robot 104 when not operating. The robot 104 may be configured to connect to the docking station 110 through the docking connector 220 while collapsed. The robot 104 may include one or more fastening devices 404 so that when the robot 104 is collapsed the one or more fastening devices 404 may be hooked or connected to the one or more other fastening devices on a wall to hang the robot 104. The one or more fastening devices 404 may be positioned beneath the adjustable platform surface 208 to be hidden and not interfere with placing objects on the adjustable platform surface 208. When the robot 104 is collapsed, the one or more fastening devices 404 may be exposed to allow the robot 104 to be hung.

The one or more arms of the robot 104 may fold such that the one or more arms may lie flat against the base 212 and/or the adjustable platform surface 208. The one or more arms may be configured to lie parallel to the adjustable platform surface 208 and/or lie parallel to the base 212. The one or more transportation components 210 may be configured to fold inward, e.g., in the direction 402, to lie against the base 212.

Figure 5:
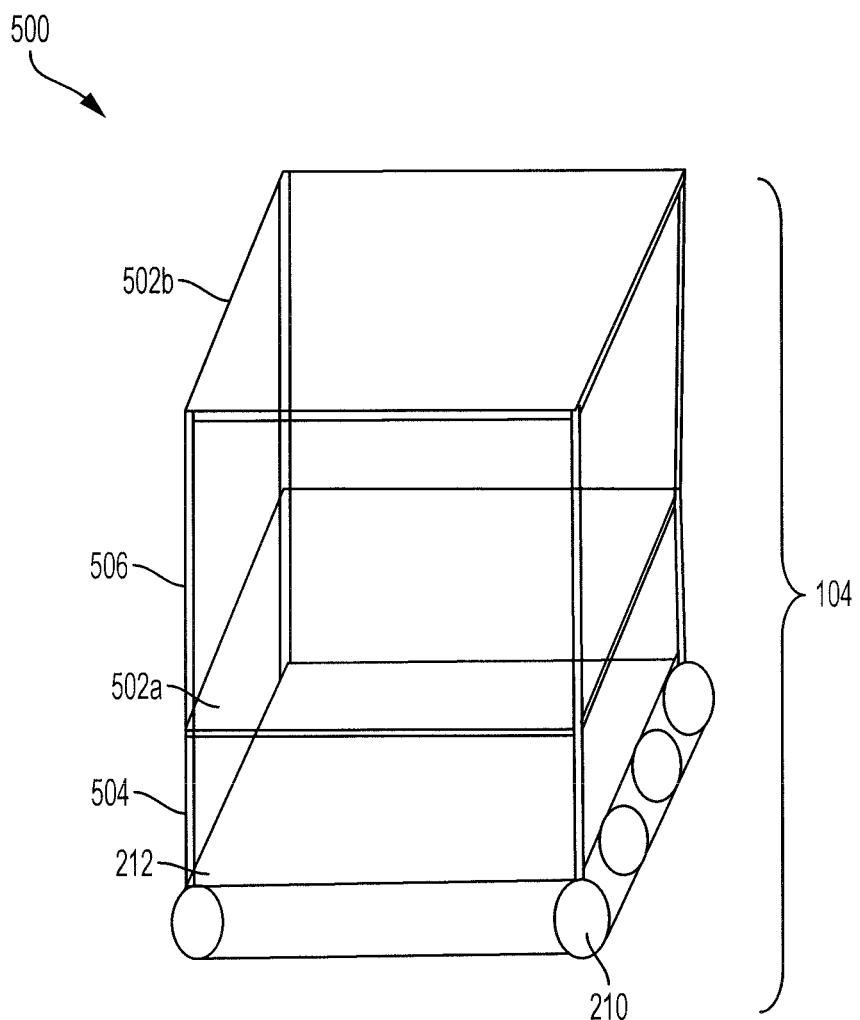
FIG. 5 is an illustration of an example multi-level configuration of an automated robot platform according to an aspect of the invention.

FIG. 5 is an illustration of an example multi-level configuration 500 of an automated robot platform. One or more computers or one or more data processing apparatuses, for example, the one or more data processors 112 of the automated platform system 100 of FIG. 1, appropriately programmed, may operate the robot 104 in the multi-level configuration 500.

The robot 104 may be configured in a multi-level configuration 500. That is, the robot 104 in a multi-level configuration 500 may have multiple platform surfaces, e.g., a first platform surface 502a and a second platform surface 502b. The multiple platform surfaces may be coupled to each other and/or the base 212 by one or more sets of arms, e.g., a first set of arms 504 and a second set of arms 506. The first set of arms 504 may connect the base 212 to the first platform surface 502a and may be configured to extend, retract and/or angle the first platform surface 502a. The second set of arms 506 may connect the first platform surface 502a to the second platform surface 502b. The second set of arms 506 may be configured to extend, retract and/or angle the second platform surface 502b. The one or more arms of the one or more sets of arms, e.g., the first set of arms 504 and the second set of arms 506, may be configured in the same or similar manner as the arms 214a-d and/or arm 302.

Figure 6:
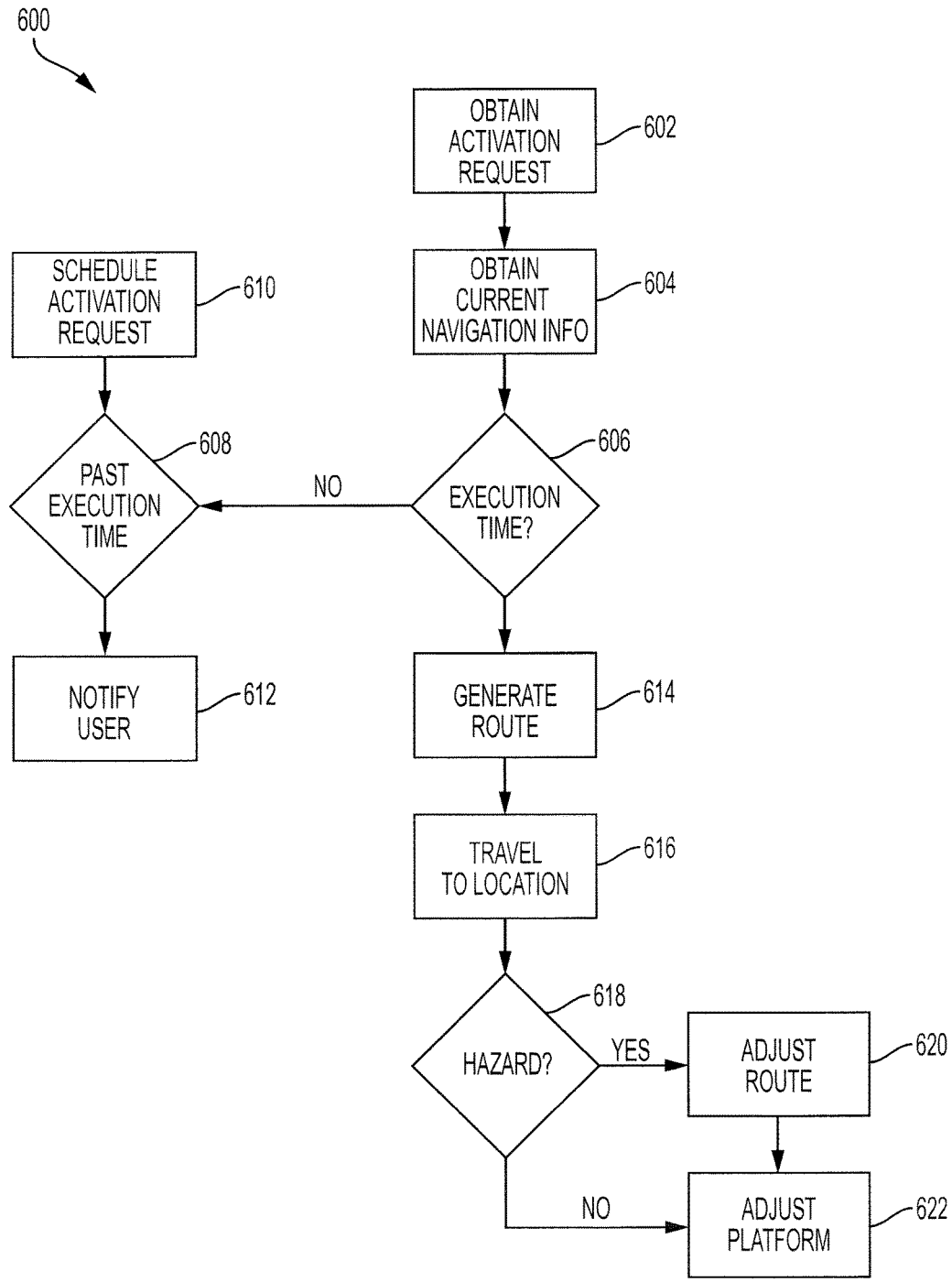
FIG. 6 is a flow diagram of an example process for executing an activation request according to an aspect of the invention.

FIG. 6 is a flow diagram of an example process 600 for executing an activation request. One or more computers or one or more data processing apparatuses, for example, the one or more data processors 112 of the automated platform system 100 of FIG. 1, appropriately programmed, may perform the process 600.

The automated platform system 100 may obtain an activation request (602). The activation request may be a request for the robot 104 to travel to one or more locations to perform one or more functions, such as raise, lower and/or angle the one or more adjustable platform surfaces to assist the user. The activation request may be, for example, a request to go to location 202 near a bookshelf and raise 2 feet high so that a user may step on the adjustable platform surface to place a book on the top shelf of the bookshelf. In another example, the activation request may be a request to travel to location 204 near the side of a bed and raise the adjustable platform to a height of 2.5 feet and angle 30 degrees so that a person lying in the bed may lean over and read from a book.

The activation request may include an execution time, an execution date and/or an execution location. In some implementations, the activation request includes one or more attributes, such as the height the robot 104 extends one or more adjustable platform surfaces vertically and/or the angle or tilt of the one or more adjustable platform surfaces. For example, the activation request may indicate "Sunday, 9:00 p.m., Location 204, Height: 2.5 feet, Angle: 15 degrees" which may be associated with the robot 104 travelling to the bedside every Sunday evening at 9:00 p.m. and raising the adjustable platform surface to a height of 2.5 feet and tilting the adjustable platform surface to an angle of 15 degrees so that a user in the bed may read from a book on the adjustable platform surface.

In some implementations, the activation request may include a mode, e.g., stepping stool mode, meal mode, reading mode and/or cart mode. Each mode may be associated with a particular task and associated with one or more attributes that define the location of the robot 104 and/or the height and/or angle of the adjustable platform surface. For example, the stepping tool mode may be associated with a user needing to reach a higher location and may be associated with a particular height, e.g., 2 feet to 3 feet higher based on one or more user settings, and an execution location. In another example, the meal mode may be associated with a user eating a meal so the particular height may be based on the height of the user when seated and associated with a location of a lounge chair in front of a television. Similarly, the reading mode may be associated with a user reading so the height may be set to a couple of feet and the adjustable platform surface may be angled. The cart mode, for example, may be associated with a user, such as a doctor, walking around multiple locations and having a need to carry one or more objects, such as a stethoscope, a laptop, a table device and/or patient charts. The adjustable platform surface may be adjusted to a particular height that corresponds to the height of the user when standing. The robot 104 may be configured to travel and follow the user and/or a beacon or transponder carried by the user, such as the personal device of the user, in the cart mode instead of travelling to a fixed location.

The automated platform system 100 may obtain the activation request from a schedule, user input from a personal device 102 and/or real-time detected information. A schedule may be pre-programmed into the robot 104 using the personal device 102. For example, the robot 104 may sync with a calendar on the personal device 102 and obtain schedule information including an execution time, an execution date and an execution location of one or more scheduled events, such as a practice time, a television show and/or a bedtime. The schedule information may include additional information including a description of the scheduled event.

The robot 104 may extract the execution time, the execution date and/or the execution location from the schedule information and generate the activation request. The automated platform system 100 may determine any missing information of the scheduled event based on the context of the scheduled information. For example, if a time is missing, the automated platform system 100 may extract one or more keywords, such as "noon," from the description of the scheduled event. In another example, if an execution location is missing, the automated platform system 100 may extract the word "sleep" and determine that the execution location is the location 204 associated with the bed.

The automated platform system 100 may obtain an activation request from user input into a personal device 102. The automated platform system 100 may display on the personal device 102 a graphical user interface (GUI) that may receive user input. For example, the personal device 102 may receive, from the user, user input including an execution location, one or more attributes for the adjustable platform surface, an execution date and/or an execution time the robot 104 should travel to the execution location, e.g., immediately, in a few hours, or at a specific time, e.g., 9:00 a.m. In some implementations, the user input may be one of the modes for the activation request, and the automated platform system 100 may determine the execution time, the execution date and/or the execution location and/or other settings, such as the height and/or the angle of the adjustable platform surface, based on the one or more attributes of the mode.

In some implementations, the automated platform system 100 may obtain the activation request in real time based on information from one or more sensors and/or one or more cameras. The automated platform system 100 may identify a user that is within the proximity of the robot 104 or within the proximity of a particular location, e.g., the bookshelf, based on one or more cameras and/or one or more sensors on the robot 104 and/or one or more cameras and/or one or more sensors in the operating environment 200. In response, the automated platform system 100 may anticipate that the user needs assistance based on the particular location. A particular location, such as a location of a bookshelf or a bed, may be pre-programmed into the robot 104 and be associated with an event that needs assistance from the robot 104, and thus, may trigger an activation request of the robot 104 when the user approaches the particular location or performs another type of motion, such as sitting down, at the particular location.

For example, one or more cameras and/or one or more sensors on the robot 104 or in the operating environment 200 may detect that a user is walking towards the location 202 of the bookshelf and anticipate an activation request. The automated platform system 100 may analyze one or more images captured from the one or more cameras and determine that the user is travelling toward the bookshelf. The automated platform system 100 may analyze a previous location of the user at a first time in a first image and/or a first frame and a subsequent location of the user at a second time in a second image and/or a second frame, and based on the locations of the user at the different times in the different images and/or frames determine that the path of the user is in the direction of the location 202 of the bookshelf. In some implementations, the automated platform system 100 may use one or more sensors, e.g., thermal sensors, motion sensors and/or other types of sensors on the robot 104 or in the operating environment 200 to determine that the user is headed toward a particular location. The one or more sensors and/or the one or more cameras in the operating environment 200 may communicate with the robot 104 through the network 106 and may be positioned in one or more locations in proximity to a location near where a user may anticipate needing assistance of an adjustable platform surface.

In some implementations, the one or more cameras may capture hand motion or gestures of a user that may trigger an activation request. For example, if a user waves his or her hand, this may signal to the robot 104 to activate and the robot 104 may travel to the user based on the hand waving motion.

In some implementations, the automated platform system 100 may obtain the activation request based on audio input received by one or more microphones either on the robot 104 or in the operating environment 200. For example, the automated platform system 100 may use voice recognition to determine that a user spoke and issued an activation request by recognizing one or more keywords spoken by the user. The automated platform system 100 may parse the spoken words of the user to obtain the execution time, the execution date, the one or more attributes and/or the execution location of the activation request. In some implementations, the automated platform system 100 may determine that a user entered a room with a specific purpose based on the audio input, and based on the user entering the room and an activation request associated with the room. For example, if the automated platform system 100 detects that a user entered the library room, the robot 104 may follow the user as the user moves from one shelf to another anticipating that the user may want to use the adjustable platform surface to access a shelf out of the user's reach. The robot 104 may use one or more sensors to determine specific user attributes such as a user's height, and adjust one or more attributes of the adjustable platform surface, e.g., the height of the adjustable platform surface, based on the specific user attributes. In another example, if the current time is a particular time and the one or more microphones capture audio input of Dr. Joe's (or Technician Tom's) voice when he enters the hospital ward (or workshop), the robot 104 may follow Dr. Joe (or Technician Tom) as he moves about the hospital ward (or workshop) anticipating that Dr. Joe (or Technician Tom) will need the equipment that the robot 104 is carrying. In addition, the robot 104 may use one or more sensors to determine specific user attributes, such as a user's height, and the height of the ceiling or other overhead obstruction and adjust one or more attributes of the adjustable platform surface, e.g., the height of the adjustable platform surface, based on the specific user attributes and the height of the ceiling or other overhead obstruction so that the user is raised up but not too high to hit his or her head on the ceiling or other overhead obstruction.

Other forms of activation requests include using a light curtain and/or one or more buttons to signal an activation request. In some implementations, the automated platform system 100 may use a combination of the one or more sensors, the one or more cameras, the one or more microphones, the user input from the personal device 102 and/or the schedule to obtain the activation request.

The automated platform system 100 may obtain the current time, the current date, and/or the current location of the robot 104 (604) using at least one of the navigation unit 118, the network access device 116, an internal clock, or one or more sensors. The automated platform system 100 may obtain navigational information from the navigation unit 118, and may parse the navigational information to obtain the current time, the current date, and/or the current location of the robot 104. In some implementations, the automated platform system 100 obtains the current time and/or the current date from a service provider using the network access device 116 to access the service provider and/or a resource on the service provider or from an internal clock.

One or more sensors or one or more cameras in the operating environment 200 or on the robot 104 may provide a current location of the robot 104, e.g., by detecting any movement of the robot 104 or by determining the position of the robot 104 relative to other objects in the operating environment 200 that have been pre-programmed into the automated platform system 100. For example, the automated platform system 100 may have a stored map that includes one or more locations of objects, such as a bookshelf, a bed, a table and/or a sofa, in a room, e.g., a living room. The automated platform system 100 may have received and stored user input that indicates the location of the objects. The map, for example, may divide each room into a grid with multiple grid squares. Each grid square may cover a corresponding portion of a room, e.g., a square foot of the room. In each grid square, the user may identify if there is an object, such as a bookshelf, a bed, a table or other object.

The automated platform system 100 may compare the location of the robot 104 with that of the one or more locations of the stored objects to determine a distance between the robot 104 and the one or more objects. For example, the stored map may indicate that a table is in the first grid square, and the automated platform system 100, using one or more cameras in the operating environment 200, may determine that the robot 104 is in an adjacent grid square to the west side of the first grid square so the automated platform system 100 is able to determine that the robot 104 is approximately a foot west of the table. In some implementations, the automated platform system 100 may use a proximity sensor and/or one or more cameras on the robot 104 to determine that the robot 104 is in proximity of the table.

The automated platform system 100 may determine whether to activate the robot 104 based on the activation request. The automated platform system 100 may compare the current time and the current date from the obtained information to the execution time and the execution date included in the activation request. When the current time and the current date match the execution time and the execution date, the automated platform system 100 may execute the activation request (606). In some implementations, the automated platform system 100 may execute the activation request prior to the execution time and the execution date. The automated platform system 100 may, for example, calculate a travel time for the robot 104 and subtract the travel time from the execution date and the execution time so that the robot 104 executes the activation request when the current time and the current date are the adjusted execution time and the adjusted execution date. The travel time may be based on a load that the robot 104 is carrying, the distance to the execution location from the current location of the robot 104, the speed of the robot 104 and/or one or more changes in the route, e.g., due to hazards. For example, if the robot 104 is scheduled to execute at 12:00 p.m. to deliver a meal to the user at the sofa, but the robot 104 is 3 minutes away from the sofa because the robot 104 is in another room, the robot 104 may execute the activation request to deliver the meal at 11:57 a.m. so that the robot 104 arrives at the sofa by 12:00 p.m.

In some implementations, the automated platform system 100 may activate the robot 104 to execute the activation request earlier than the execution time and/or the execution date based on a threshold safety margin. The threshold safety margin may be a configuration setting that is user configurable. For example, a particular user may prefer that activation requests associated with scheduled event are executed a few minutes prior to the execution time and/or the execution date.

The automated platform system 100 may determine whether the current time and the current date are past the execution date and the execution time (608). If the current time and the current date are before the execution time and the execution date, the automated platform system 100 may store the activation request in the schedule so that the automated platform system 100 may execute the activation request later when the current date and the current time match the execution time and the execution date (610). If the current time and the current date are after the execution time and the execution date, the automated platform system 100 may send or transmit a notification to the user on the personal device 102 of the invalid activation request (612). In some implementations, if the current date and the current time are after the execution time and the execution date but within a threshold amount of time, the automated platform system 100 may activate the robot 104 and may execute the activation request. The threshold amount of time may be user configurable.

The automated platform system 100 may generate a route from the current location of the robot 104 to the execution location (614). The automated platform system 100 may use information from a stored map to generate the route. For example, the automated platform system 100 may generate a route that navigates the robot 104 around the locations of the one or more objects in the stored map. A user may modify, edit and/or add one or more objects to the stored map using the personal device 102 to control and/or manage the generation of the route. For example, the user may configure one or more regions that the robot 104 may not navigate through or one or more regions that the route must follow.

The automated platform system 100 may travel to the execution location from the current location by operating the one or more transportation components 210 to follow the generated route (616). In some implementations, the automated platform system 100 does not generate a route, but instead travels to the execution location from the current location by using a transceiver to follow a beacon, e.g., a signal sent by the personal device of a user that may indicate the location of the user. In some implementations, the automated platform system 100 uses one or more cameras and one or more sensors to navigate to the execution location using video feedback. The robot 104 may collect information from the one or more cameras and the one or more sensors in both the environment and on the robot 104, and navigate toward the execution location using the video and/or sensor feedback. For example, the robot 104 may analyze the video feedback, e.g., to determine the distance between the robot 104 and other objects and a direction to travel, and navigate toward the location of the bookshelf. As the robot 104 identifies other objects along the path to the location of the bookshelf, the robot 104 may react and adjust to avoid the other objects. The robot 104 may analyze the video feedback to determine the distance and the direction of travel by dividing the video image into a grid to determine the relative location of the robot 104 and the one or more objects. A combination of the various implementations may be used to navigate the robot 104 to the execution location.

The automated platform system 100 may use one or more sensors or one or more cameras to determine whether there are one or more objects that are hazards along the route being travelled by the robot 104 (618). For example, a proximity sensor of the robot 104 may detect that an object, such as a dog or a child's toy, is along the route of the robot 104. In another example, a captured video image may indicate that the dog is right in front of the robot 104 based on the grid location of the dog and the robot 104.

If the one or more objects are within a threshold distance of the path of the robot 104, the automated platform system 100 may adjust the route to navigate around the location of the object (620). The automated platform system 100 may update the stored map with the location of the object if the automated platform system 100 detects that the object remains at the location for a threshold amount of time. In some implementations, the automated platform system 100 uses the one or more cameras to identify objects along the path of the robot 104. The one or more cameras may be on the robot 104 or in the operating environment 200 of the robot 104. In some implementations, a user on the personal device 102 may adjust the route of the robot 104 in real-time or when generating the route. For example, one or more cameras on the robot 104 may send or transmit back for display on the personal device 102 a view of the route in front of the robot 104. The automated platform system 100 may receive user input, e.g., a selection of a button or motion, corresponding to an adjustment of the route travelled by the robot 104. For example, the user may rotate the personal device 102 at an angle clockwise to make the robot 104 turn or angle right or the user rotate the personal device 102 at an angle counter-clockwise to make the robot 104 turn or angle left.

The automated platform system 100 may adjust the height and/or the angle of an adjustable platform surface based on at least one of user input, user configuration settings, or the activation request (622). The height and/or the angle settings of the one or more adjustable platform surfaces may be included in one or more of the attributes included in the activation request. The automated platform system 100 may use the one or more attributes to set the height and/or the angle of the one or more adjustable platform surfaces. In some implementations, the activation request includes a mode which corresponds to user configured settings that set the height and/or the angle of the one or more adjustable platform surfaces based on the mode in the activation request. In some implementations, the automated platform system 100 may obtain real time user input from the user on the personal device 102 to adjust the height and/or the angle of the one or more adjustable platform surfaces such as a selection of a user interface element that corresponds to an adjustment of the height and/or the angle of the adjustable platform surface. The automated platform system 100 may adjust the height and/or angle settings using user input from the personal device 102 and/or the one or more user interface elements on the robot 104.

Figure 7:
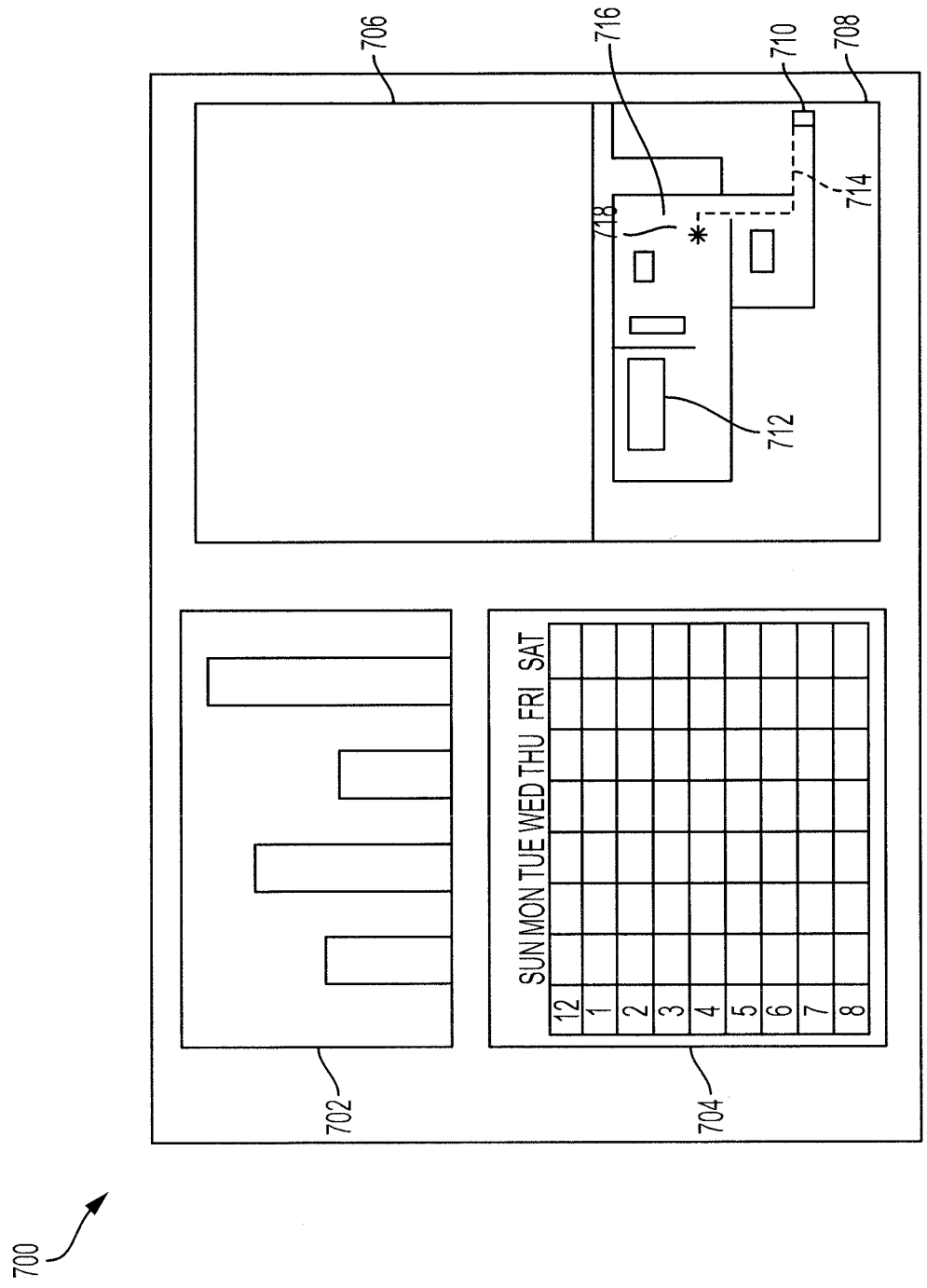
FIG. 7 is an illustration of an example graphical user interface display on a personal device according to an aspect of the invention.

FIG. 7 is an illustration of an example graphical user interface (GUI) display 700 of a personal device 102. One or more computers or one or more data processing apparatuses, for example, the one or more data processors 112 of the automated platform system 100 of FIG. 1, appropriately programmed, may implement the GUI display 700 on the personal device 102.

The GUI display 700 may be configured to display notifications, user configurable settings, monitoring information, schedule information and/or one or more captured images. The GUI display 700 may have one or more display frames, e.g., display frames 702, 704, 706 and 708. One or more display frames may display notifications, user configurable settings, monitoring information, schedule information, location information and/or one or more camera views.

For example, the display frame 704 may display a schedule of activation requests for the robot 104. In another example, the display frame 702 displays monitoring information, and the display frame 706 displays an image from the one or more cameras. The display frame 708, may display a map 716 including a location 718 of the robot 104 relative to the map 716 of the building. The map 716 may include one or more locations of one or more objects, such as a location 712 of a table, a historical path 714 of the robot 104 and/or a location 710 of the docking station 110.

The monitoring information may include information describing the height and/or the angle of the adjustable platform surface, load on the adjustable platform surface and/or nearby objects. The monitoring information may include battery level information or maintenance information, such as the number of software and/or hardware faults. The schedule information may include information describing the date/time that the robot 104 is to perform one or more activation requests.

The GUI display 700 may be configured to receive user input to send or transmit to the robot 104. The user input may include adjustments for one or more attributes of the adjustable platform surface and/or movement of the robot 104, user configurable settings for setting the threshold safety margin, schedule and/or route information that describes the route, date and time of the robot 104.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An automated robot platform, comprising:
a base;
one or more arms coupled to and extending from the base and having an actuator;
an adjustable level platform surface coupled to the actuator of the one or more arms;
one or more imaging devices configured to capture an image of a surrounding environment;
one or more transportation components coupled to the base, the one or more transportation components configured to move in a plurality of directions; and
one or more data processors that perform operations stored on a computer readable storage medium and are configured to:
obtain the image from the one or more imaging devices,
operate the one or more transportation components to move in the plurality of directions to a first location based on the image, and
control the actuator to position the adjustable level platform surface to a first height and a first angle when the first location is reached.

2. The automated robot platform system of claim 1, wherein each arm of the one or more arms comprises:
a casing having a cavity; and
a screw disposed within the cavity of the casing, the screw configured to rotate in either a clockwise or counterclockwise rotation, and at least a portion of the screw surrounded by the casing.

3. The automated robot platform of claim 1, wherein the adjustable level platform surface includes a first portion and a second portion, wherein the one or more arms include a first arm that has a first cavity and a first screw and a second arm that has a second cavity and a second screw, wherein the
first screw is disposed within the first cavity of the first arm and configured to move the first portion in a first direction along the first arm and the second screw is disposed within the second cavity of the second arm and configured to move the second portion in a second direction along the second arm.

4. The automated robot platform of claim 1, wherein the one or more transportation components include one or more wheels or one or more treads.

5. The automated robot platform of claim 1, further comprising:
a transceiver configured to receive a signal that includes location information from one or more beacons, wherein the one or more data processors are further configured to:
obtain the signal that includes the location information, and
operate the one or more transportation components to move in the plurality of directions based on the location information.

6. The automated robot platform of claim 1, wherein to control the actuator to position the adjustable level platform surface to the first height and the first angle when the first location is reached is based on user input received from a personal device.

7. The automated robot platform of claim 1, wherein
the one or more data processors are further configured to
operate the one or more transportation components to move in the plurality of directions to a second location.

8. The automated robot platform of claim 7, wherein the one or more data processors are further configured to:
determine that the automated robot platform is at the second location; and
adjust the adjustable level platform surface to a second height and a second angle.

9. The automated robot platform of claim 1, wherein the one or more data processors are configured to:
detect a position or action of an individual using at least one or more microphones or the one or more imaging devices;
determine that there is an activation event based on the position or action of the individual; and
operate the one or more transportation components to move in a direction toward a location of the individual.

10. The automated robot platform of claim 1, wherein the automated robot platform is configured to collapse vertically into a compact form.

11. The automated robot platform of claim 1, wherein the first angle is greater than 0degrees relative to the base.

12. The automated robot platform of claim 1, wherein the first angle is greater than 0degrees and less than 90 degrees relative to the base.

13. An automated robot platform, comprising:
a base;
one or more arms coupled to and extending from the base and having an actuator;
an adjustable level platform surface coupled to the actuator of the one or more arms;
one or more imaging devices configured to capture an image of a surrounding environment;
one or more transportation components coupled to the base, the one or more transportation components configured to move in a plurality of directions including a first direction and a second direction; and
one or more data processors coupled to the actuator and the one or more imaging devices and configured to:
obtain the image from the one or more imaging devices,
operate the one or more transportation components to move in the first direction to a first location based on the image,
control the actuator to position the adjustable level platform surface to a first height and a first angle when the first location is reached,
operate the one or more transportation components to move in the second direction to a second location, and control the actuator to position the adjustable level platform surface to a second height and a second angle when the second location is reached.

\* \* \* \* \*